United States Patent [19]
Olden

[11] Patent Number: 5,553,961
[45] Date of Patent: Sep. 10, 1996

[54] HINGE AND HINGE JOINT FOR HINGEDLY CONNECTING STRUCTURAL FRAME MEMBERS

[75] Inventor: Michael M. Olden, Pacific, Mo.

[73] Assignee: MiTek Holdings, Inc., Wilmington, Del.

[21] Appl. No.: 333,526

[22] Filed: Nov. 2, 1994

[51] Int. Cl.[6] .................................................. F16B 15/06
[52] U.S. Cl. ....................... 403/119; 403/13; 403/283; 403/405.1; 52/641
[58] Field of Search ................................. 403/283, 403, 403/405.1, 68, 70, 119, 103, 107, 13–14; 52/641, 642, DIG. 6, 639, 726.2; 411/461–468; 16/366, 371

[56] References Cited

U.S. PATENT DOCUMENTS

| | | |
|---|---|---|
| Re. 31,234 | 5/1983 | Jureit et al. ........................ 403/163 |
| 3,479,783 | 11/1969 | Jureit ..................................... 52/641 X |
| 3,605,355 | 9/1971 | Solesbee ............................... 52/541 X |
| 3,760,550 | 9/1973 | Mueller et al. ........................ 52/641 |
| 3,785,108 | 1/1974 | Satchell .............................. 52/641 X |
| 3,823,522 | 7/1974 | Jureit et al. ........................... 52/641 |
| 4,381,635 | 5/1983 | Solo ..................................... 52/639 |
| 4,483,120 | 11/1984 | Gottlieb ............................ 52/641 X |
| 4,538,393 | 9/1985 | Mitchell ............................. 56/366 X |
| 4,549,838 | 10/1985 | Birckhead .................... 603/405.1 X |
| 5,094,059 | 3/1992 | Ganescu ................................ 52/641 |

*Primary Examiner*—Kenneth J. Dorner
*Assistant Examiner*—Harry C. Kim
*Attorney, Agent, or Firm*—Senniger, Powers, Leavitt & Roedel

[57] ABSTRACT

A hinge for use in pairs hingedly connecting two generally coplanar wooden structural members of a wooden truss structure enabling folding of the structure to reduce its height for transport over the road, comprising two pivotally interconnected plates each having teeth for nailing them to the wooden members and one having fingers for engagement with a surface of a wooden member for accurate alignment of two of the hinges for being nailed to the two members at opposite faces thereof to form a hinged joint between the members, and hinged joints utilizing the hinges.

17 Claims, 10 Drawing Sheets

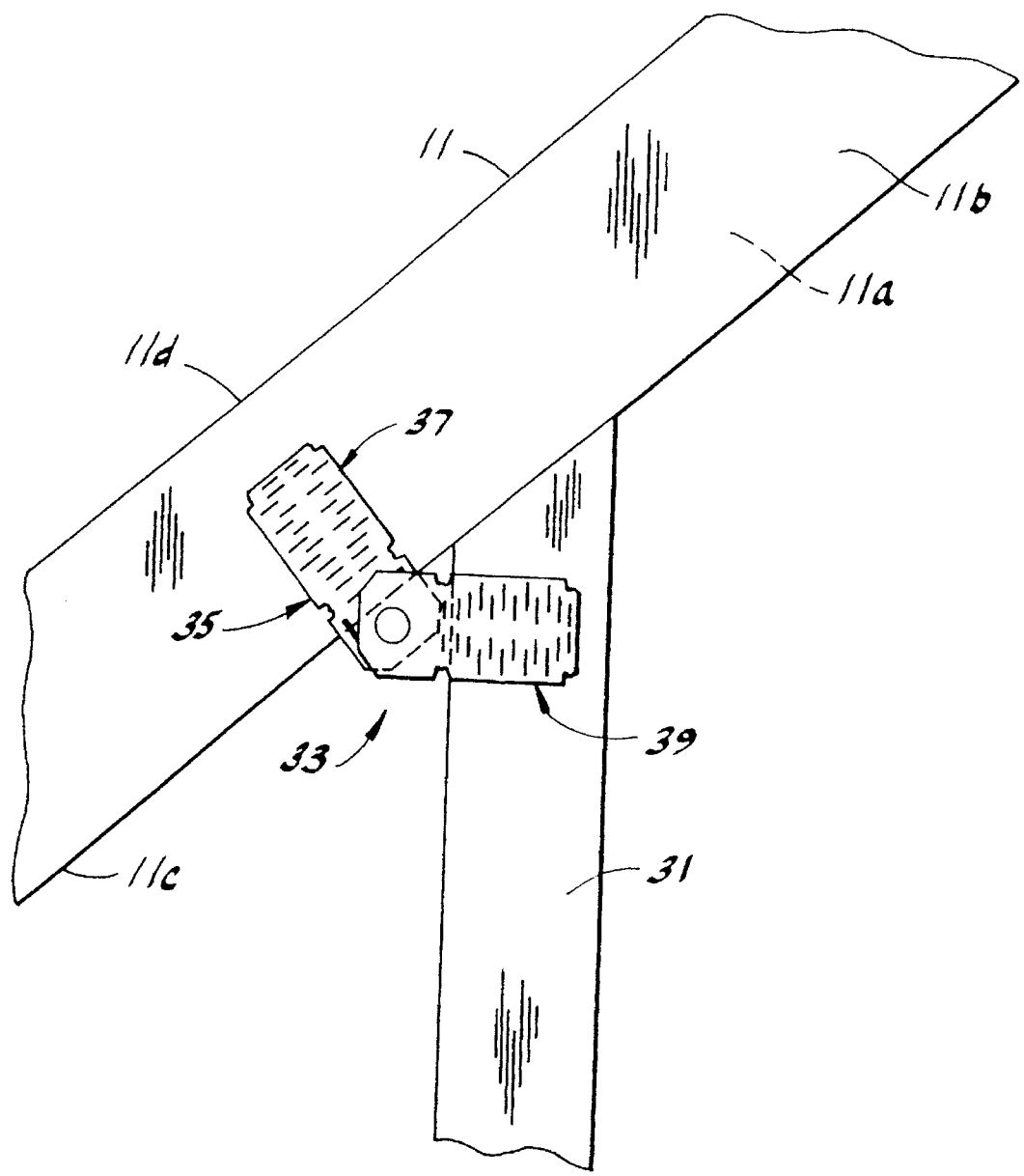

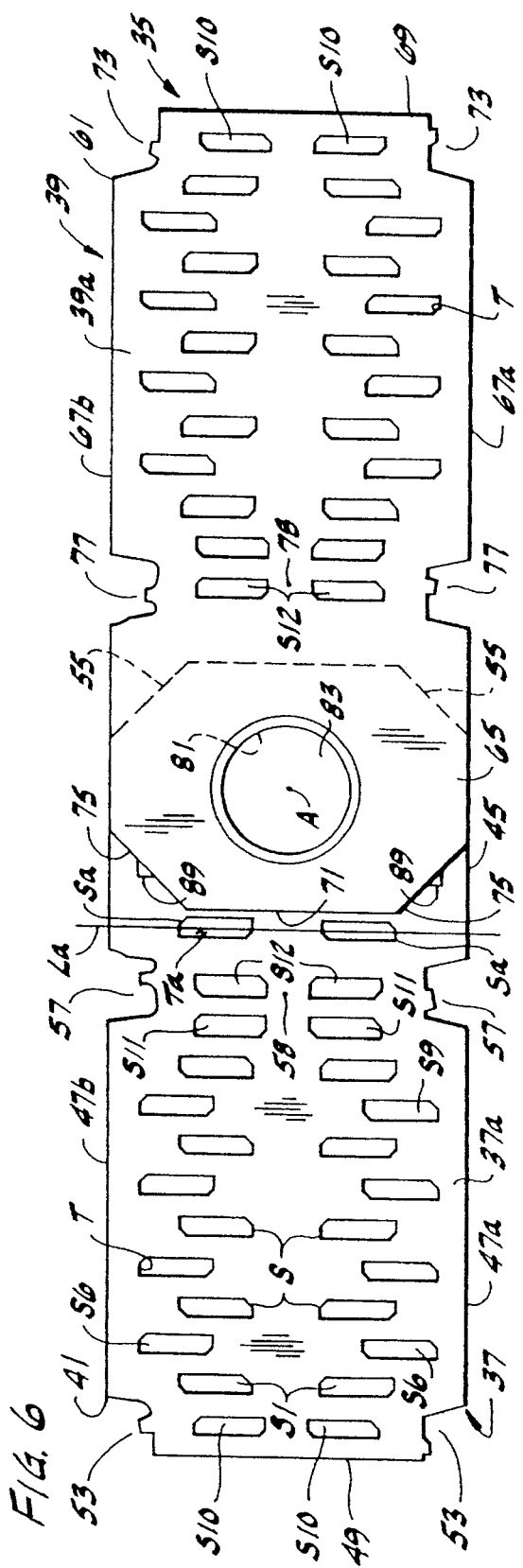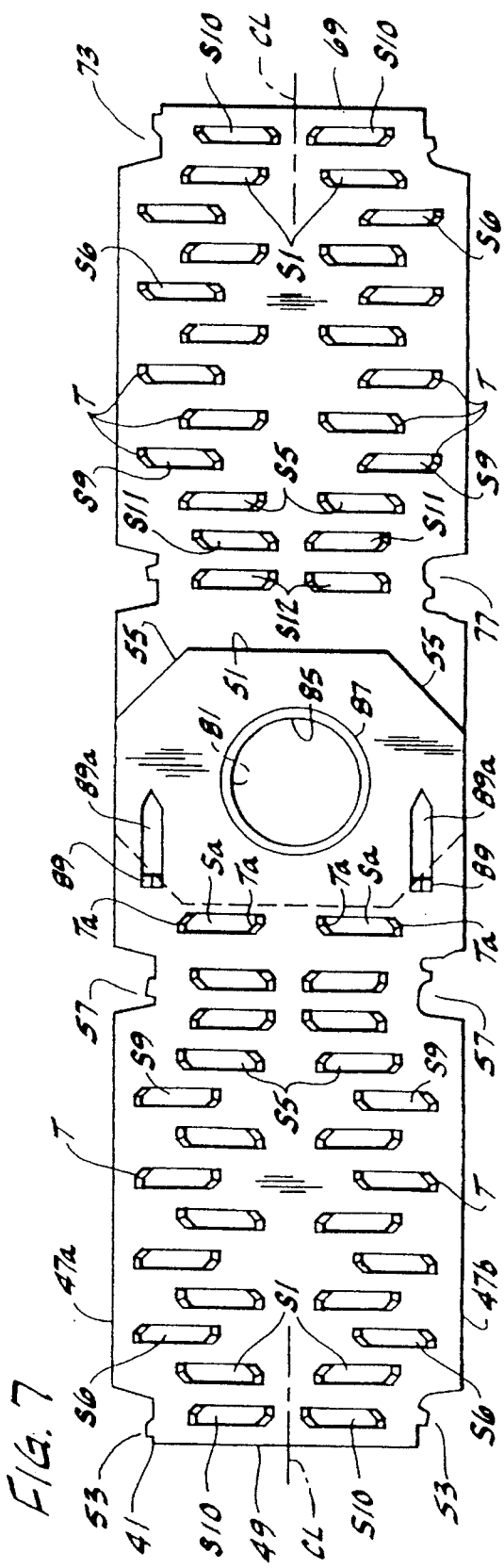

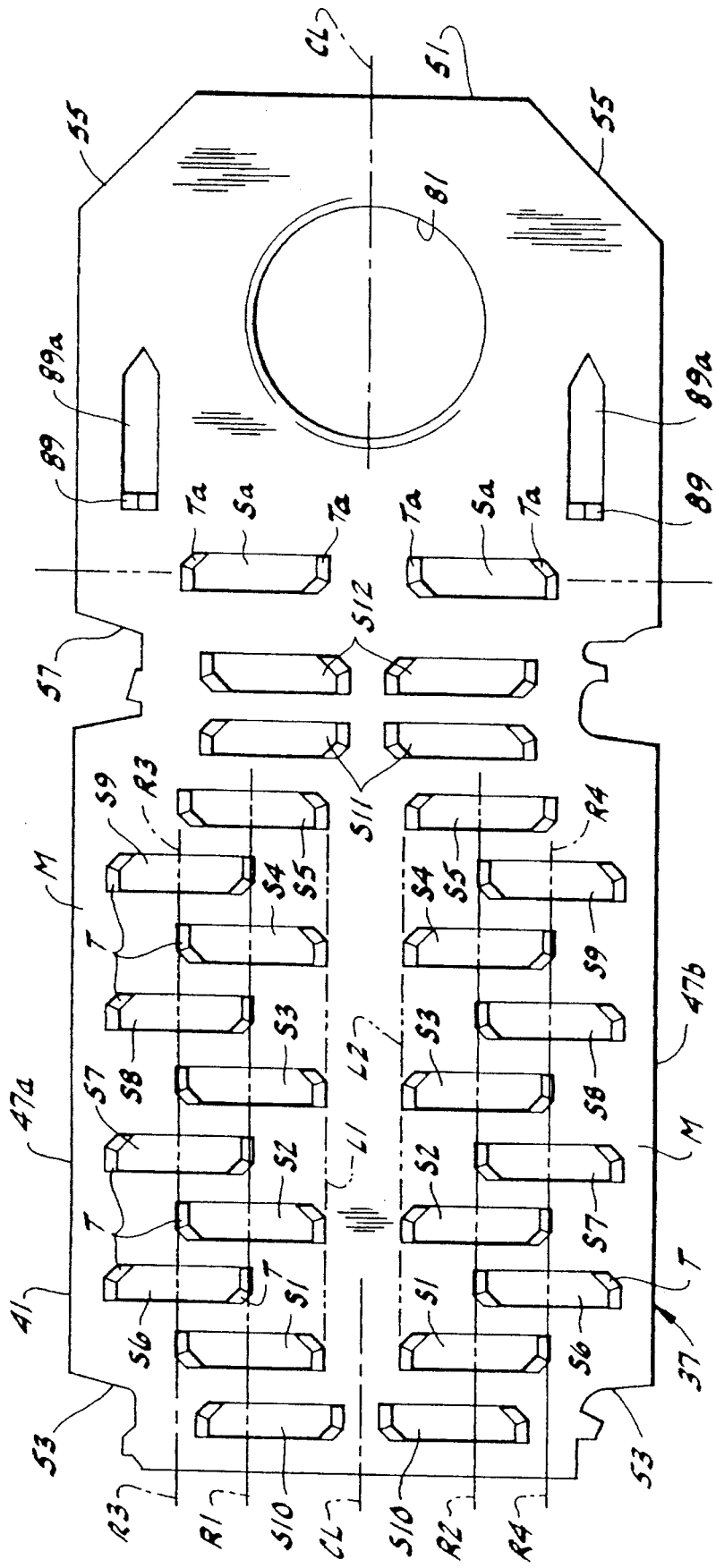

5,553,961

HINGE AND HINGE JOINT FOR HINGEDLY CONNECTING STRUCTURAL FRAME MEMBERS

BRIEF SUMMARY OF THE INVENTION

This invention relates to a hinge and a hinge joint for hingedly connecting structural frame members, more particularly to a hinge and hinge joint for hingedly connecting members of a truss structure, the joint comprising two of the hinges on opposite faces of the truss members which meet at the joint.

The invention may be regarded as involving an improvement upon the hinges and hinge joints disclosed in U.S. Pat. No. Re. 31,234, reissued May 10, 1983, entitled Hinged Connector Plate, this reissue patent having been assigned by mesne assignments to MiTek Holdings, Inc., the assignee of this invention and this application.

The aforesaid reissue patent discloses the prefabrication of a wooden roof truss structure with provision for folding of certain members of the truss structure from the positions they would have in the structure as fully erected to a folded collapsed position for reducing the overall size of the structure to accommodate it to over-the-road transport to a job site without exceeding road height limitations or wide load limitations. In the prefabrication of the structure, hinged joints are provided for pivoting certain members of the structure relative to others for swinging movement of said certain members between their ultimate position in the structure as erected and their folded collapsed position, using a special hinge comprising two pivotally interconnected plates formed with struck-out teeth for nailing of the plates in the truss members. Two such hinges are used at each joint, one on one face and one on the opposite face of the wooden members which meet at the joint. Prefabrication of a truss structure as shown in the reissue patent is carried out on a jig having means for positioning the wooden truss members for being assembled. A hinge is placed on the jig at each joint with its teeth extending up. The wooden members are set in place on the teeth and a second hinge is placed on top of the wooden members with its teeth extending down. Pressure is applied to the hinges for driving of the teeth of the lower hinge and the teeth of the upper hinge into the wooden members. The upper hinge is eye-spotted in place on the wooden members for registry with the lower hinge, i.e. for alignment of the pivot axis of the upper hinge with the pivot axis of the lower hinge. But with reliance on eye-spotting, accurate registration does not always occur and the upper hinge may be set in place with its pivot axis undesirably offset from the pivot axis of the lower hinge. Use of a pin such as indicated at 64 in FIG. 10 of the reissue patent does not satisfactorily solve the problem, in that there is a tendency for the pin to be knocked off vertical, so that the upper hinge is offset from the lower hinge.

Among the several objects of this invention may be noted the provision of a hinge for hingedly connecting members of a frame structure for pivotal movement of one of said members relative to the other about an axis transverse to the plane of the members having means facilitating accurate alignment of two hinges for being fastened to the two members at opposite faces thereof to form a hinged joint between the two members, with one hinge on one face and the other hinge on the opposite face of the two members; the provision of such a hinge for hinging two wooden members of a wooden frame structure, and more particularly a wooden roof truss structure, adapted for nailing to the wooden members; the provision of such a hinge which is economical to manufacture with sufficient strength for utilization in hinged joints of truss structures; the provision of an improved pattern of teeth for such hinges; and the provision of structurally sound joints utilizing the hinges.

The hinge and hinge joint of this invention are especially useful in wooden roof truss structures, including half-truss structures such as prefabricated by a truss fabricator which are adapted to be collapsed for transport to a modular housing fabricator. The latter uses the half-trusses in the prefabrication of modules for a house, complete with a roof for the module including a series of the half-trusses with sheathing and roofing on the half-trusses, the modules being transported with the roof structure folded down to a horizontal position to enable transport over the road to the site where they are to be assembled to form a complete house. It will be understood that the invention is, of course, useful for fabricating truss structures, and particularly high-pitch truss structures, to be transported to the site of a house on which the truss structure are to be erected, the truss structures being collapsed for transport.

In general, a hinge of this invention, for use in pairs hingedly connecting two generally coplanar structural members for pivotal movement of one of said members relative to the other in the plane of said members about an axis transverse to the plane of said members, comprises first and second elongate sheet metal plates each having one face constituting its outside face and the other face constituting its inside face. Each plate has a generally flat body portion and a generally flat extension from said body portion, the extensions being overlapped with the outside face of the extension of the first plate in generally flatwise interengagement with the inside face of the extension of the second plate. Means are provided pivotally interconnecting the overlapped extensions relative to each other about an axis perpendicular to the plates. One of the plates has means extending from the inside face thereof adapted for engagement with a surface of one of said members for locating said first plate in a predetermined position relative to said one member.

A joint of this invention, for hingedly connecting two coplanar structural members for pivotal movement of one of said members relative to the other in the plane of said members, comprises a pair of hinges each as set forth above. Each member has first and second generally flat opposite faces and a surface in a plane perpendicular to said faces. A first hinge of said pair of hinges has the body portion of its first plate fastened to the first face of one of said members and the body portion of its second plate fastened to the first face of the other of said members with said locating means on the said one plate engaging said surface of said one member and locating the axis of the pivotal interconnection means of said first hinge of the pair at a predetermined distance from said surface of said one member. The second hinge of said pair of hinges has the body portion of its first plate fastened to the second face of said one member and the body portion of its second plate fastened to the second face of the other of said members.

A hinge of this invention for use in pairs hingedly connecting two generally coplanar wooden structural members, e.g., wooden roof truss members, has the body portion of each of the plates formed with nailing teeth extending from the inside face thereof constituting the plates as nailing plates for nailing of the first plate to one of the wooden members and the second plate to the other of said wooden members. A feature of this type of hinge is a pattern of slots and teeth in which there are first and second rows of slots in each plate on opposite sides of the longitudinal center line of the plate, the slots in each of said first and second rows extending transversely of the plate, and third and fourth rows of slots in each plate extending transversely of the plates and interdigitated with and offset outwardly from the slots of the first and second rows, the teeth extending perpendicularly to the plate at the ends of the slots.

Other objects and features will be in part apparent and in part pointed out hereinafter.

BRIEF DESCRIPTION OF THE DRAWINGS

FIGS. 3, 4 and 5 are enlarged fragments of FIG. 1 showing the hinge joints;

FIG. 6 is a view of one face (referred to as the outside face) of a hinge of this invention per se, on a larger scale than FIGS. 3–5;

FIG. 7 is a view of the other face (referred to as the inside face) of the hinge per se, on the scale of FIG. 6;

FIG. 12 is an enlargement of the left-hand part of FIG. 7.

Corresponding reference characters indicate corresponding parts throughout several views of the drawings.

DETAILED DESCRIPTION

Figure 1:
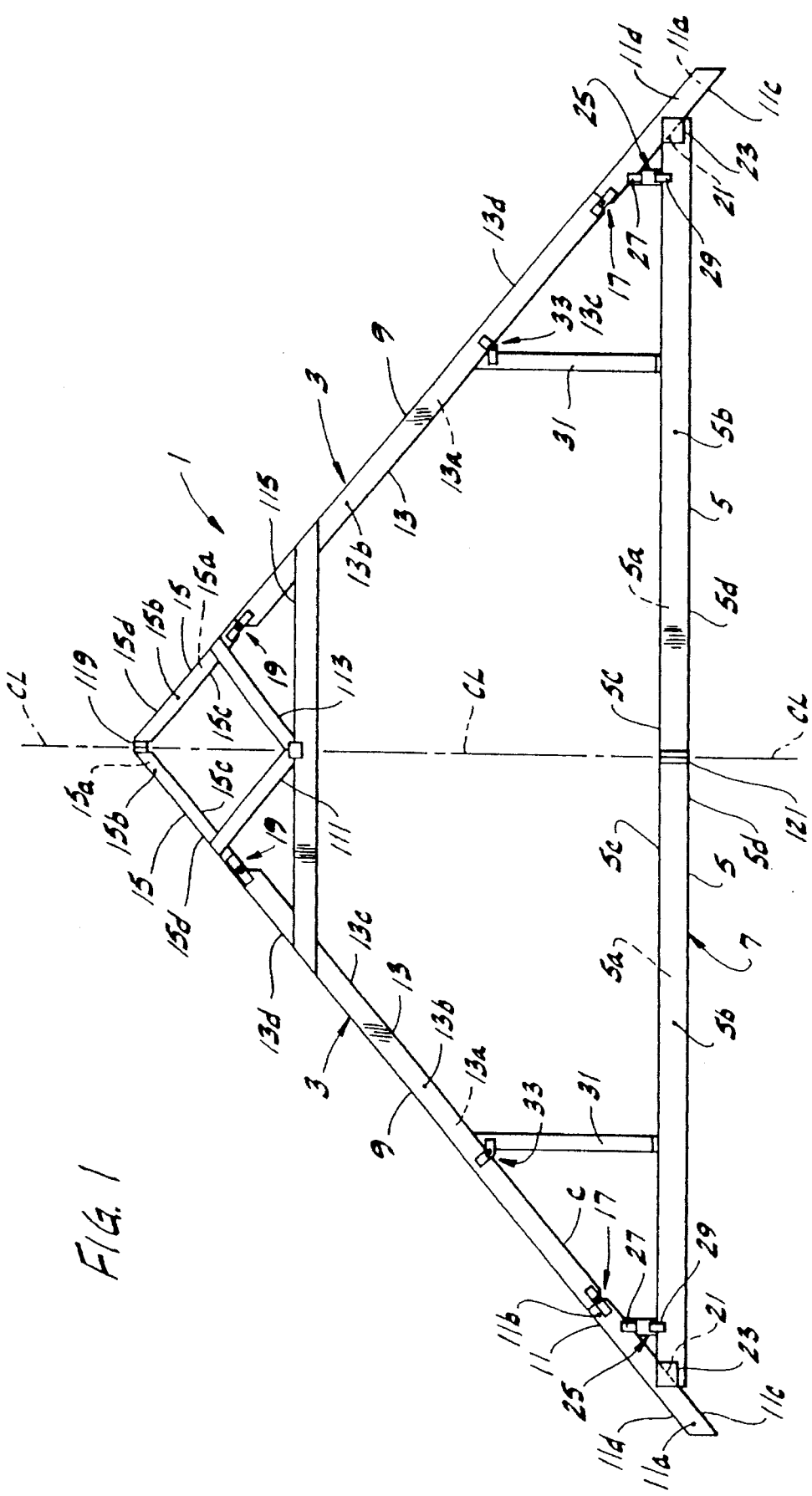
FIG. 1 is a view in elevation of a full wooden roof truss structure having hinge joints of this invention each comprising a pair of hinges of this invention, the structure being formed by interconnecting two half-truss structures.
Figure 2:
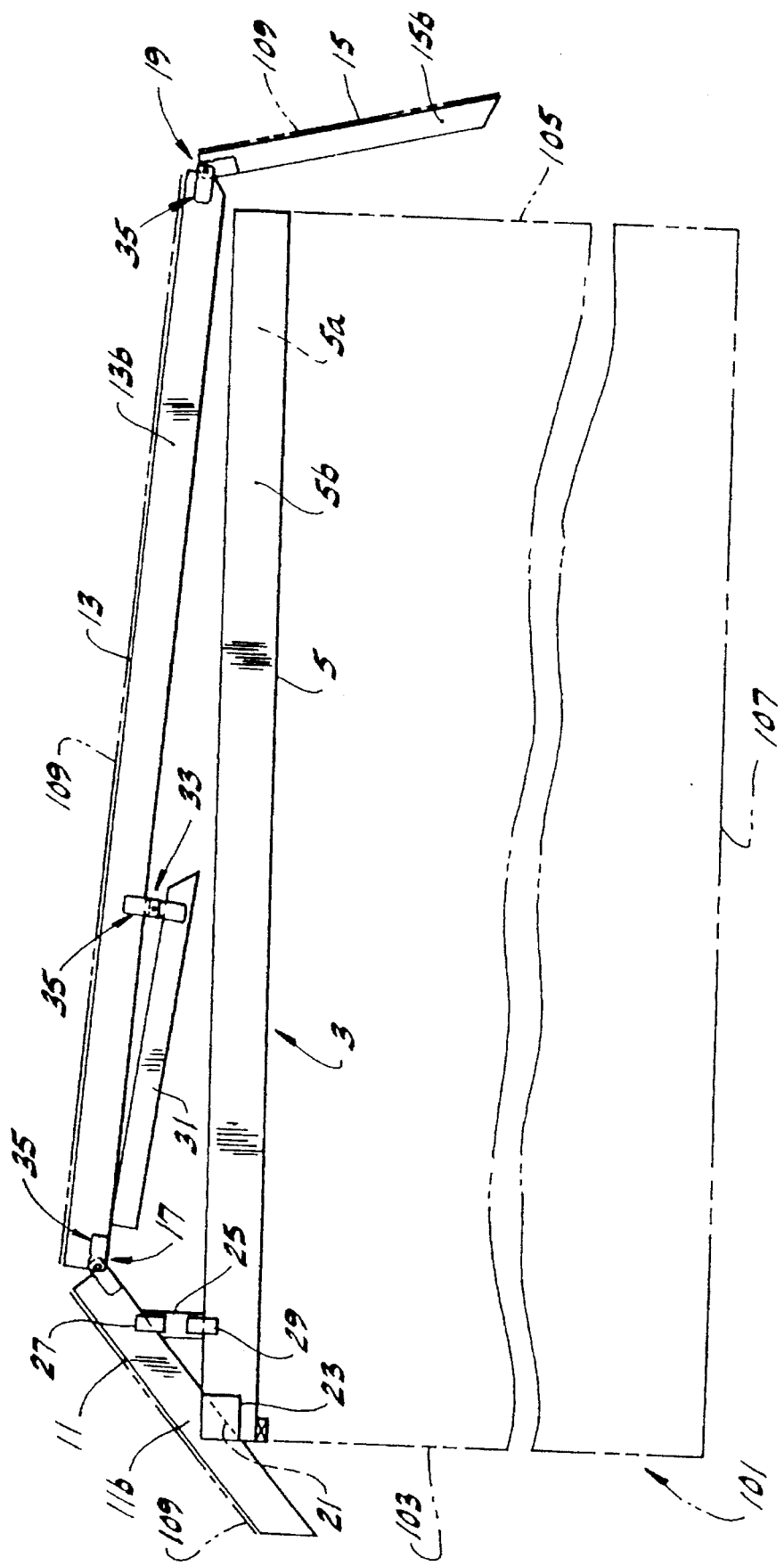
FIG. 2 is a view showing one of the half-truss structures of FIG. 1 with members of the half-truss structure in a folded collapsed position in which they are placed for transport.

Referring to FIG. 1 of the drawing, a relatively high pitch gable roof truss having hinge joints of this invention is shown generally in its final completed form as erected at a job site. The truss, designated 1 in its entirety, is a wooden truss comprising two half-truss structures, each designated 3, on opposite sides of the vertical center line CL of the truss. Each half-truss structure 3 comprises a length 5 of 2"×10" lumber, for example, which forms half of the bottom chord 7 of the completed truss, and a top chord 9 of the truss. The top chord 9 comprises three lengths of lumber 11, 13 and 15 hingedly connected together at joints indicated at 17 and 19 for being arranged in the aligned end-to-end erected position in which they are shown in FIG. 1, or in the folded or collapsed position in which they are shown in FIG. 2. Lengths 11 and 13 may be 2"×6" lumber and length 15 may be 2"×4" lumber, for example. The length 11 of lumber constitutes a lower member or heel member of the top chord 9, the length 13 constitutes an intermediate member, and the length 15 constitutes an upper member or peak member of the top chord. The upper end of the heel member 11 and the lower end of the intermediate member 13 are hingedly connected at 17, and the upper end of the intermediate member 13 and the lower end of the upper member 15 are hingedly connected at 19, the intermediate member 13 being foldable relative to the heel member 11 and the upper member 15 being foldable relative to the intermediate member 13 to the collapsed position in which it is illustrated in FIG. 2 for collapsing the half-truss structure to the collapsed conformation in which it is illustrated in FIG. 2 for transport.

Figure 3:
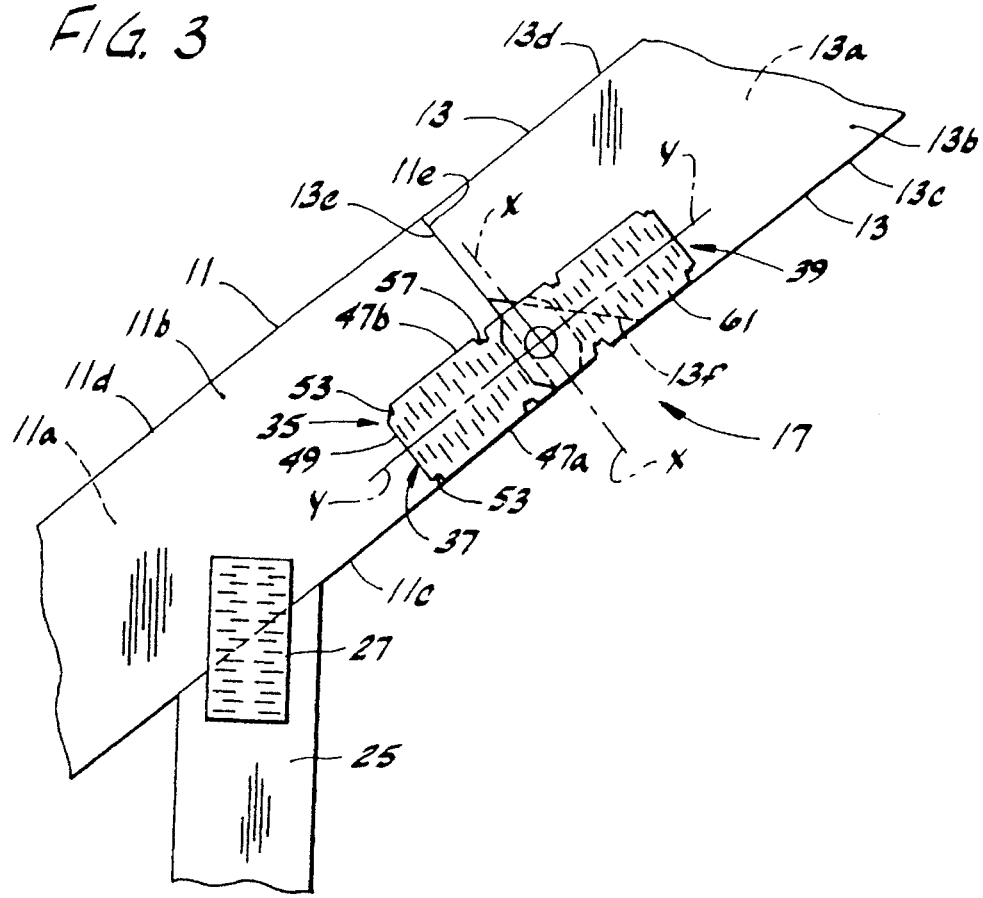

For purposes of this description, each piece of lumber 5, 11, 13 and 15, each of which is of rectangular cross-section, is referred to as having opposite faces (the broad faces of the respective piece) and opposite sides (the narrow sides of the respective piece). The opposite faces of pieces 11, 13 and 15 are designated 11a and 11b, 13a and 13b and 15a and 15b, respectively. The opposite sides of pieces 11, 13 and 15 designated 11c and 11d, 13c and 13d and 15c and 15d, respectively. Member 5 has opposite faces 5a and 5b and opposite sides 5c and 5d. As shown best in FIG. 3, member 11 has an end 11e (its upper end) at the joint 17 cut at right angles to its length presenting a flat surface in a plane transverse to said member. Member 13 has an end at the joint 17 (its lower end) including a portion 13e cut at right angles to its length presenting a flat surface in a plane transverse to member 13 and a portion 13f cut at an angle of 45°, for example, to the length of member 13. As shown best in FIG. 4, member 13 has an end at the joint 19 (its upper end) including a portion 13g cut at right angles to its length presenting a flat surface in a plane transverse to member 13. It may also have an end portion such as indicated at 13h cut at an angle of 45°, for example, to its length. Member 15 has an end at the joint 19 (its lower end) having a portion 15e cut at right angles to its length presenting a flat surface in a plane transverse to member 15 and a portion 15f cut at an angle of 45°, for example, to the length of member 15.

As to each half-truss structure 3, the bottom chord member 5 is beveled at a 45° angle at one end as indicated at 21. The heel member 11 of the top chord is secured to the beveled end 21 extending at a 45° angle to the bottom chord member 5, this securement being as by means of nailing plates such as indicated at 23 driven into both faces of the members 5 and 11. A short strut such as indicated at 25 is interposed adjacent the heel of the half-truss structure between members 5 and 11 and fastened thereto by nailing plates 27 and 29 driven into both faces of members 5 and 11. Each half-truss structure 3 is fabricated at the fabrication site with the bottom chord member 5 and the top chord 9, with the latter comprising the three members 11, 13 and 15 hingedly interconnected at the joints 17 and 19. It is further fabricated at the fabrication site with a length 31 of lumber, such as 2"×4" lumber, hinged at 33 (see FIGS. 1, 2 and 5) to the intermediate top chord member 13 at a point between joints 17 and 19, this length 31 of lumber constituting what is termed a kneewall member dimensioned to extend between the erected intermediate member 13 and the bottom chord member 5.

Two hinges are used at each of the joints 17, 19 and 33, one on the a face and the other on the b face of the wooden truss members to be hingedly interconnected. It is important that the two hinges be accurately aligned i.e., that the pivot axis of one hinge be accurately aligned with the pivot axis of the other, and this invention enables quick and accurate alignment of the two hinges, as will appear. With regard to the hinges shown in the aforesaid reissue patent, it is difficult accurately to effect this alignment for the driving of the plates.

Figure 8:
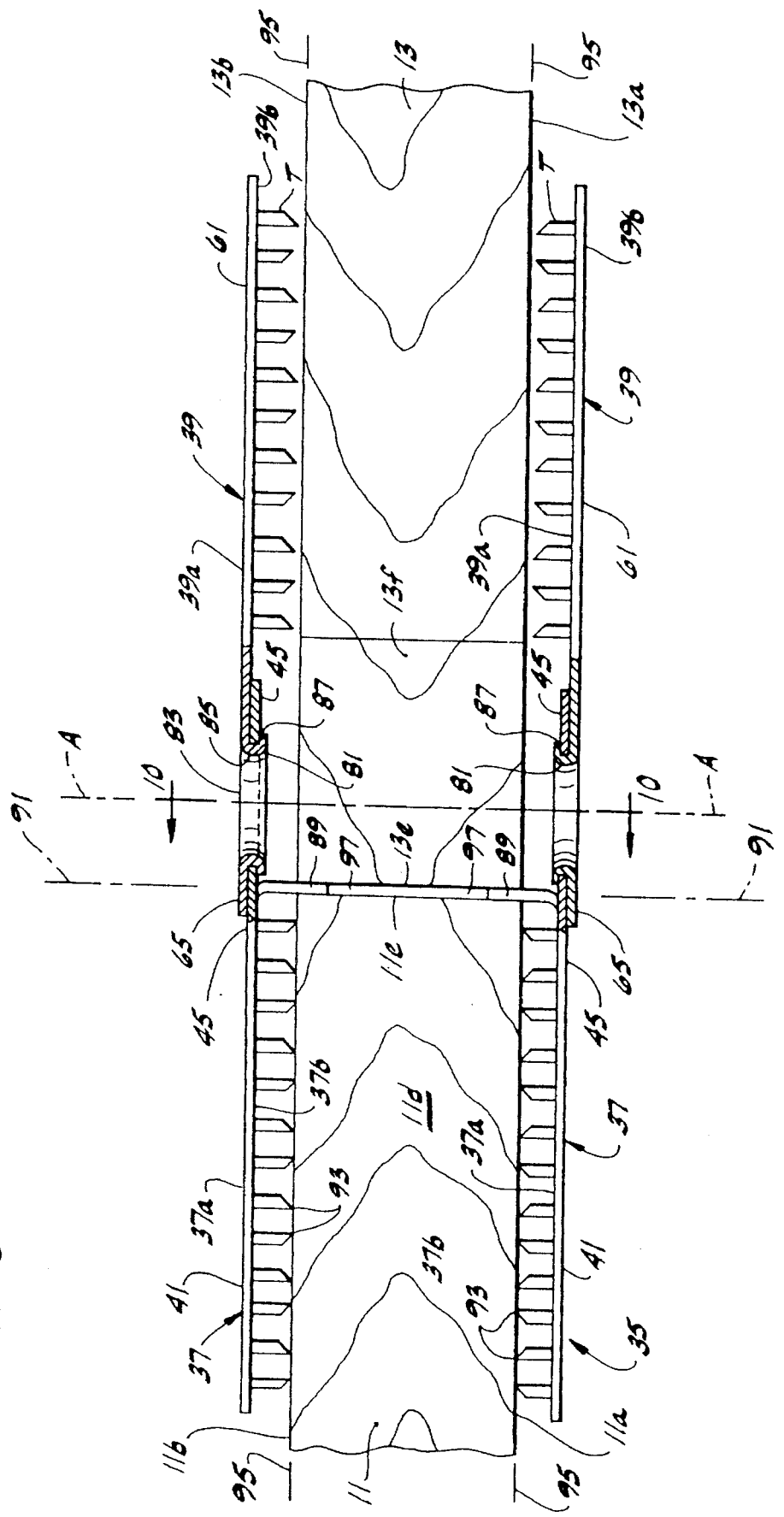
FIG. 8 is a view in side elevation with parts broken away and shown in section showing how a first hinge plate is set in place on a jig in position for forming a hinged joint between two truss members, further showing how the two truss members are set in place on said first hinge plate, and the how second hinge plate is set in place on top of the truss members for the driving of the teeth of the hinge plates into the truss members.
Figure 9:
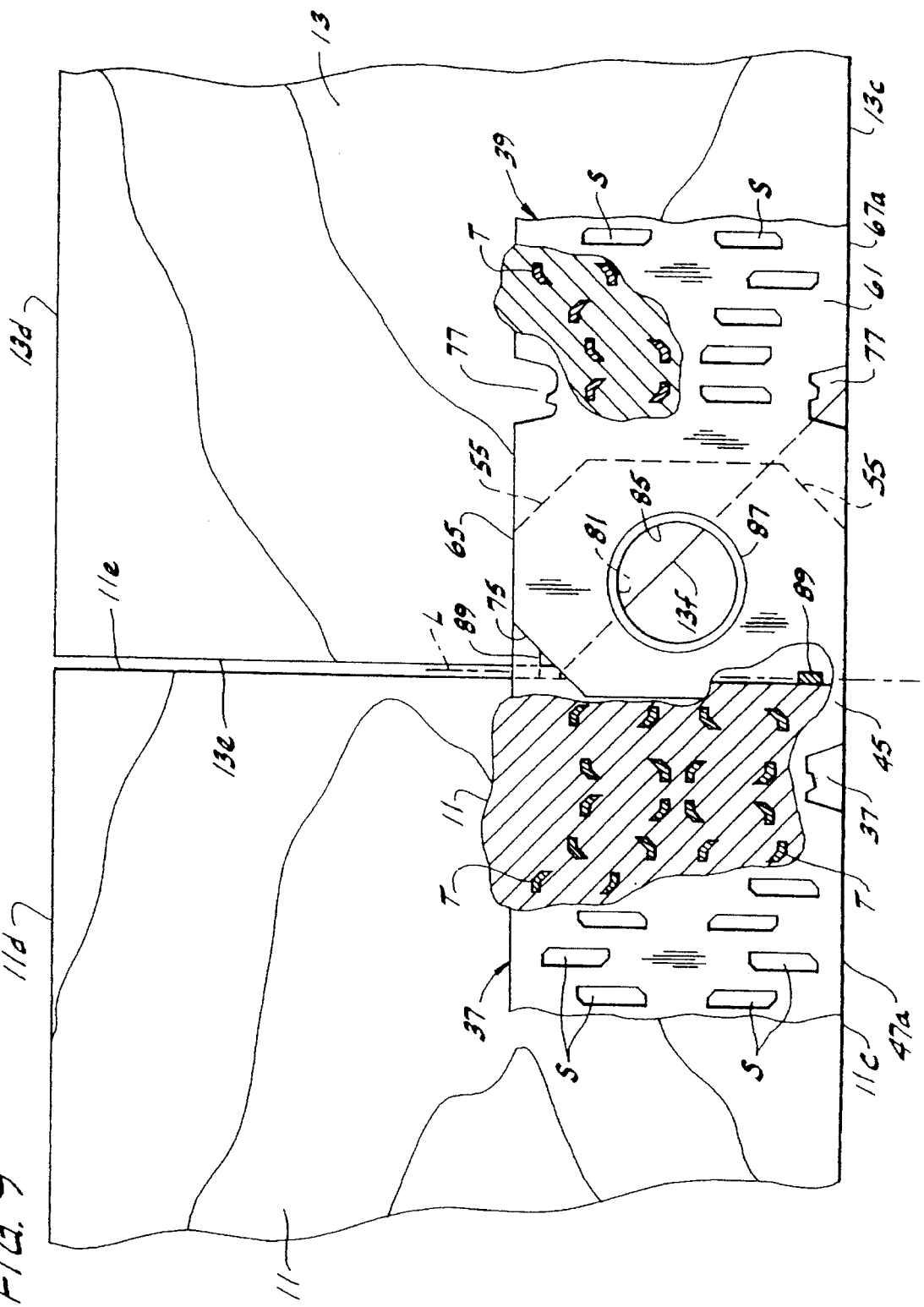
FIG. 9 is a partial top plan of FIG. 8 broken away to show one of the fingers of the top hinge.

Referring more particularly to FIGS. 6–8, each of the two hinges used at each joint 17, 19 and 33 is designated in its entirety by the reference numeral 35 and is shown to comprise first and second elongate sheet metal (steel) plates 37 and 39. Plate 37 has a first face 37a constituting what will be referred to as its outside face, and a second face 37b constituting what will be referred to as its inside face. Plate 39 has a first face 39a constituting what will be referred to as its outside face, its other face 39b constituting what will be referred to as its inside face. The first plate 37 has a generally flat generally rectangular body portion 41 formed with teeth T extending from its inside face 37b constituting the plate as a nailing plate for being nailed to a wooden member. Plate 37 further has a generally flat extension 45 from its body portion 41. Plate 37, including the body portion 41 and extension 45 thereof, is of generally rectangular form having parallel side edges 47a and 47b, an outer end edge designated 49 and an inner edge designated 51. The corners of the plate at its outer end are notched as indicated at 53 and the corners of the plate at its inner end are mitered as indicated at 55 (see FIG. 7). Also, the plate has notches such as indicated at 57 in its side edges, these notches being aligned transversely of the plate and defining a narrow bridge portion 58 of the plate between and interconnecting the main body portion 41 of the plate and its extension 45. The notches 53 and 57 are produced in the manufacture of plates 37 from coiled sheet strip to provide for indexing forward of the strip at plate length intervals through a die for striking the teeth out of the body portion of the plate and segmenting the strip at plate length intervals. The die also shears off portions of the strip to form the mitered corners 55 of the plates. The teeth T are struck from the body portion 41 of the plate 37 in pairs leaving a slot generally designated S in the plate for each pair of teeth. The slots extend transversely with respect to the plate and the teeth extend perpendicularly to the plate at the ends of the slots. The slots and the teeth may be formed as shown in U.S. Pat. No. 3,951,033.

The second plate 39, like the first plate 37, has a generally flat generally rectangular body portion 61 formed with teeth T extending from its inside face 39b constituting plate 39 as a nailing plate for being nailed to a wooden member. Plate 39 has a generally flat extension 65 extending from its body portion 61. Plate 39, including the body portion 61 and extension 65 thereof, is of generally rectangular form having parallel side edges each designated 67a and 67b, an outer end edge designated 69 and an inner edge designated 71. The corners of the plate at its outer end are notched as indicated at 73 and the corners of the plate at its inner end are mitered as indicated at 75. Also, the plate has notches such as indicated at 77 in its side edges, these notches being aligned transversely of the plate and defining a narrow bridge portion 78 of the plate between and interconnecting the main body portion 61 of the plate and its extension 65. As with the plate 37, the notches are produced in the manufacture of plates 39 from coiled sheet strip to provide for indexing forward of the strip at plate length intervals through a die for striking the teeth out of the body portion of the plate and segmenting the strip at plate length intervals. The die also shears off portions of the strip to form the mitered corners 75 of the plates. The teeth T are struck from the plate 39 in pairs leaving a slot 79 in the plate for each pair of teeth, the slots extending transversely with respect to the plate, the teeth extending perpendicularly to plate at the ends of the slots.

The plate 37 is formed with a circular opening 81 in its extension 45 and the plate 39 is formed with a circular opening 83 in its extension 65 and an annular flange 85 extending around the opening. The extension 65 of plate 39 is lapped over the extension 45 of plate 37, the inside face 39b of the extension 65 of plate 39 being in generally flatwise interengagement with the outside face 37a of the extension 45 of the plate 37, the flange 85 fitting in the opening 81, and the rim 87 of the flange being deformed to extend radially outwardly on the inside of the extension 45 around the opening 81 thereby providing means for pivotally interconnecting the overlapped extensions for pivotal movement of each plate relative to the other about an axis A perpendicular to the plates.

In addition to the teeth T struck from the body portion of the plate 37, the plate has two pairs of teeth specially designated Ta in the extension 45 of the plate. The teeth Ta are located on a line La extending transversely of the plate relatively closely adjacent the opening 81 in the extension. They increase the resistance of the hinge to buckling in compression. The teeth Ta, like the teeth T, are struck from the plate 37 in pairs leaving a slot Sa for each pair of teeth Ta.

Figure 10:
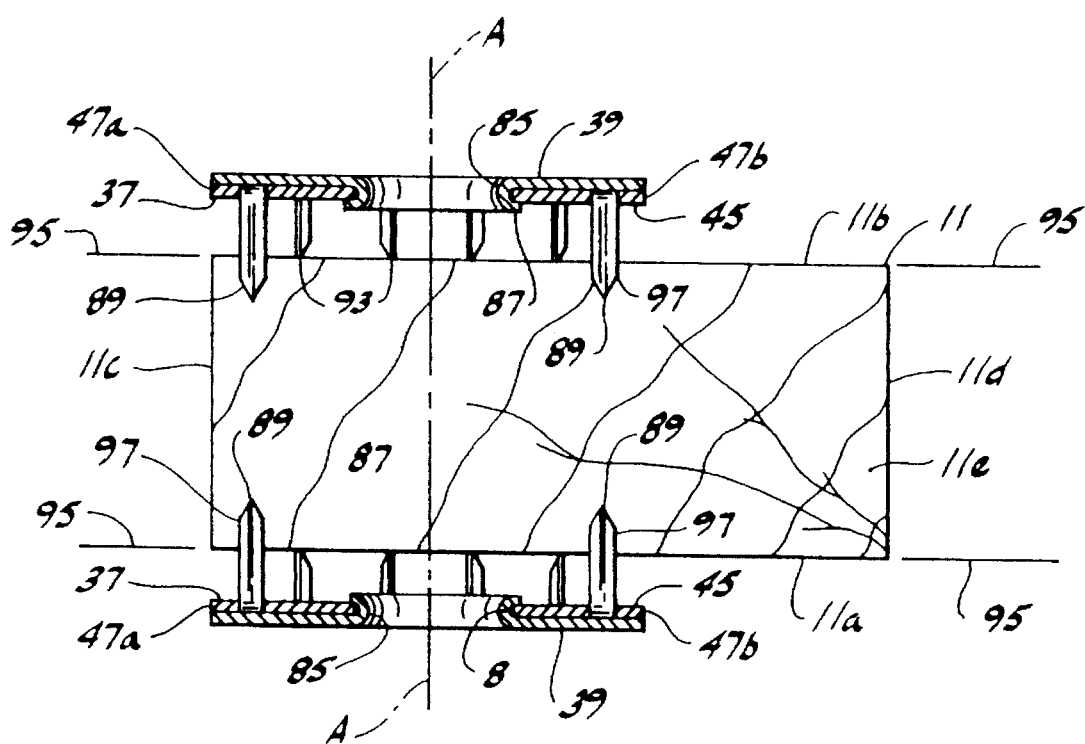
FIG. 10 is a view on line 10—10 of FIG. 8 with one piece of lumber removed showing how the hinge plates are aligned transversely of the truss members.
Figure 11:
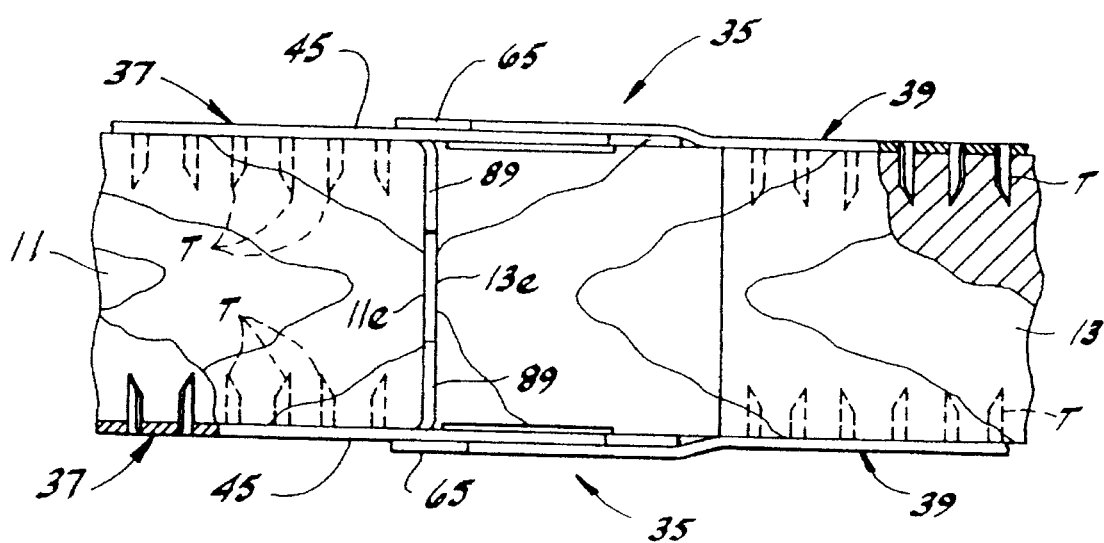
FIG. 11 is a view corresponding to FIG. 8 showing the joint completed with the teeth of the hinges driven into the truss members.

In accordance with this invention, the plate 37 has plate locating means comprising a pair of fingers each designated 89 struck therefrom extending from the inside face 37b thereof lying in a plane indicated at 91 in FIG. 8 which is perpendicular to the plate 37 and which extends transversely with respect to the plate 37 at right angles to the side edges 47a, 47b of the plate. The teeth T and Ta of the plate 37 have pointed ends 93 which are located in a plane indicated at 95 in FIG. 10 parallel to the plane of the plate 37. The fingers 89 are longer than the teeth T and Ta and project beyond the plane 95 of the pointed ends of the teeth 43. With the fingers 89 projecting beyond this plane 95, the tips 97 of the fingers are adapted for sidewise engagement with a surface (e.g. surface 11e) of a wooden truss member to locate the plate 37 in a predetermined position relative to said member. As shown, the fingers 89 are struck out of the extension 45 of plate 37 to extend perpendicularly to the plate, vacating slots 89a in the extension extending lengthwise with respect to the plate 37 adjacent opposite side edges 47a, 47b of the plate. The fingers 89 extend from the ends of the slots 89a adjacent the notches 57, thus being rooted in the extension 45 of plate 37, and extend on opposite sides of the opening Fabrication of each half-truss structure 3, comprising wooden member 5 constituting half of the bottom chord 7 of a complete truss 1, wooden members 11, 13 and 15 constituting the top chord of the half-truss structure, wooden strut 25 and the wooden knee wall member 31, is carried out at a truss fabrication site utilizing a jig having means for locating the hinges 35 which are to be driven into the a faces of the wooden truss members for forming the hinge joints 17, 19 and 33 for locating the nailing plates which are to be driven into a faces of the wooden truss members at 23, 27 and 29 and for locating the wooden truss members 5, 11, 13, 15 and 31 as shown in FIG. 1. These hinges and nailing plates which are to be driven into the a faces constitute lower hinges and lower nailing plates of the layout. Member 5 and strut 25 are set in place in the position shown in FIG. 1 over the lower nailing plates at 23, 27 and 29. Member 11 is set in place in the position shown in FIG. 1 bearing on the teeth of the lower nailing plates at 23 and 27 and bearing adjacent its end 11e on the teeth of the body portion 41 of the lower hinge 35 for joint 17. Side edge 11c of the member 11 is aligned with side edge 47a of the plate 37 of the lower hinge (see FIGS. 3 and 10), and the tips 97 of fingers 89 of plate 41 of the lower hinge are interengaged with end surface 11e of member 11 (see particularly FIG. 8). This locates the axis A of the pivotal interconnection means formed by annular flange 85 rotary in opening 81 of the lower hinge 35 on an axis indicated as the X axis in FIG. 3 which extends transversely with respect to member 11 at a predetermined distance from end surface 11e and on a Y axis which extends longitudinally with respect to member 11 at a predetermined distance from the plane of the side edge 11c of member 11. Plate 41 and 61 of the lower hinge 35 for the joint 17 are aligned. Member 13 is set in place in the position shown in FIGS. 1 and 3 in line with member 11 with end surface 13e of member 13 contiguous to the end surface 11e of member 11. Side edge 13c of member 13 is aligned with side edge 67a of the plate of the lower hinge. The fingers 89 of the plate 37 of the lower hinge extend up on the end surface 13e of the member 11 in the space between the end surfaces 11e and 13f of the members 11 and 13.

Following the laying out of the pieces of lumber 11 and 13 on top of the plates 37 and 39 of the lower hinge 35 at 17, the upper hinge 35 for the joint at 17 is applied as shown in FIGS. 1, 3, 8 and 11. The upper hinge is applied with the teeth of its plate 37 extending down with the tips of the teeth engaging the upper face 11b of member 11, and with the teeth of its plate 39 extending down with the tips of the teeth toward the upper face 13b of member 13. The upper hinge at 17 is aligned with the lower hinge at 17 to bring the axis A of the pivotal interconnection means of the upper hinge at 17 into coaxial relation with the axis A of the lower hinge at 17 by aligning the side edge 47a of the plate 41 of the upper hinge with the side edge 11c of the member 11 for alignment on the aforesaid Y axis (FIG. 3) and by engaging the tips 87 of the locating fingers 89 with the end surface 11e of member 11 (in the space between end surface 11e of member 11 and angled end surface 13f of member 13) for alignment on the aforesaid X axis FIG. 3). In this regard, it will be observed that with the side edge 47a of the plate 41 of the upper hinge aligned with the side edge 11c of member 11, the axis A of the pivotal interconnection means of the upper hinge is located the same distance from the plane of the side edge 11c of member 11 as the distance between the axis A of the pivotal interconnection means of the lower hinge and the side edge 11c of member 11. And with the tips of the fingers 89 of the upper hinge engaging the end surface 11e of the member 11, the axis A of the pivotal interconnection means of the upper hinge is located the same distance from end surface 11e as the distance between the axis A of the pivotal interconnection means of the lower hinge and end surface 11e. Thus, accurate alignment of the upper and lower hinges, i.e., precise coaxial relationship of the axes of the pivotal interconnection means of the two hinges at the joint is readily and effectively attained. The alignment of the side edge 47a of the lower hinge 35 with the side edge 11c of the member 11 is readily attained by means of the locating members on the jig, and the alignment of the side edge 47a of the upper hinge with the side edge 11e of the member 11 may be readily obtained, for example, by feel with the fingers.

Figure 4:
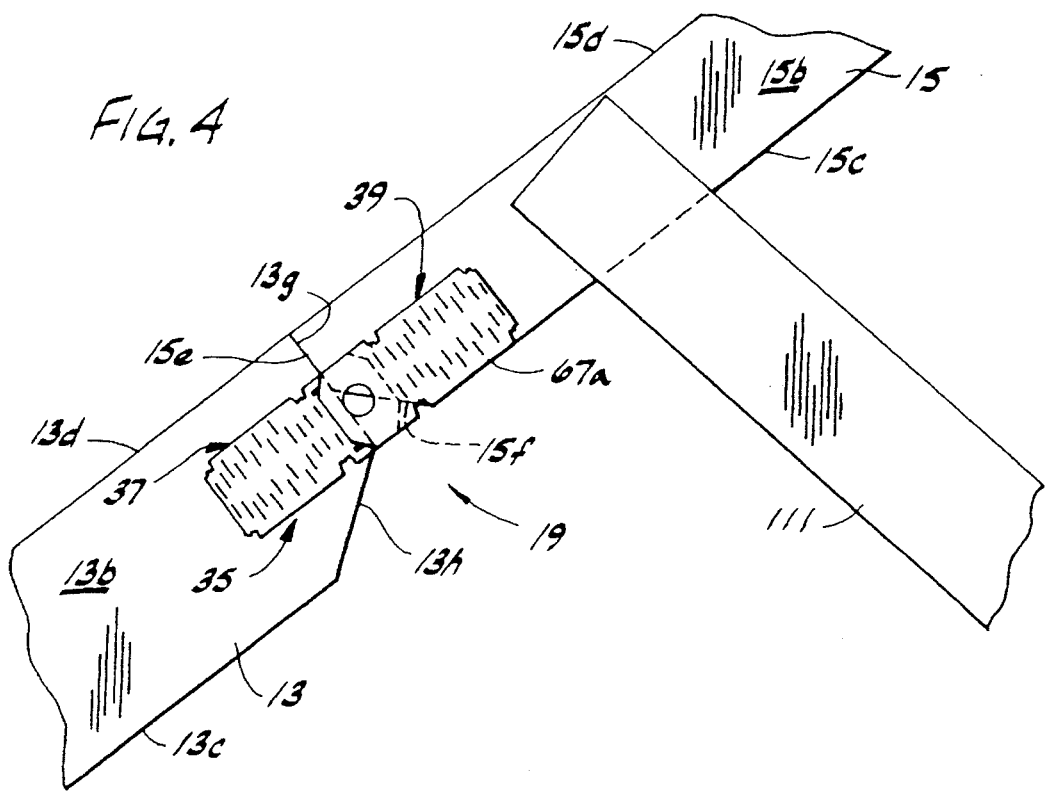

The assembly of the hinges and members 13 and 15 at the location of the joint 19 is carried out in a manner similar to that described for the assembly of the hinges and members 11 and 13 to form the joint 17 except that, as shown in FIG. 4, the hinge is located transversely (i.e, on the X axis) by aligning the side edge 67a of plates 39 of the lower and upper hinges with side edge 15c of member 15, and by engagement of the tips of fingers 89 of the plates of the two hinges with end surface 13g of member 13. As to the joint 19, the fingers 89 of plates 37 of the two hinges are accommodated in the space between end surface 13g of member 13 and angled end surface 15f of member 15.

In the assembly of the two hinges and members 11 and 31 at joint 33 the fingers 89 of the lower and upper hinges 35 are engaged with side edge 11c of member 11 to locate the axis of the pivotal interconnection means of the two hinges at the same distance from the side edge 11e of member 11. The location of the pivotal interconnection means longitudinally of the member 11 for obtaining coaxial relationship of the axes of the pivotal interconnection means of the two hinges is gauged as by eye, but the use of hinges 35 simplifies the assembly at least to the extent of facilitating the accurate location of the upper hinge transversely of the member 11 (if not longitudinally).

Following the positioning of the wooden truss members, hinge plates and nailing plates as above described, the hinge plates and nailing plates are subjected to pressure by hydraulic press means (not shown), such as conventionally used for the driving of nailing plates, to drive the teeth of the hinges and nailing plates into the respective wooden members, thereby completing the hinged joints at 17, 19 and 33 and the fastening of parts at 23, 27 and 29. It will be observed that as to each of the hinged joints at 17 and 19, the joint hingedly connects two generally coplanar wooden structural members (11 and 13 at 17, 13 and 15 at 19) for pivotal movement of one of said members relative to the other in the plane of said members, each member having first and second generally flat opposite faces (the a faces and the b faces) and a surface in a plane perpendicular to said faces (e.g. end surface 11e on member 11, end surface 13g on member 13). The joint comprises a pair of hinges 35 as above described. A first hinge (the lower hinge) of said pair has the body portion 41 of its first plate 37 nailed by the teeth thereof on the first face (e.g. 11a) of one of said members (e.g. 11) and the body portion 61 of its second plate 39 nailed by the teeth thereof to the first face (e.g. 13a) of the other of said members (e.g. 13) with portions 97 of the fingers on said first plate 37 engaging a surface (e.g. 11e) of said one member locating the axis A of said first (lower) hinge of the pair at a predetermined distance from said surface (11e) of said one member. The second hinge (the upper hinge) of said pair has the body portion 41 of its first plate 37 fastened to the second face (e.g. 11b) of one of said members (e.g. 11) and the body portion 61 of its second plate 39 fastened to the second face (e.g. 13b) of the other (13) of said members with said portions of the fingers on the first plate of the second (upper) hinge engaging said surface (11e) of said one member (11) locating the axis A of the second (upper) hinge of the pair at said predetermined distance from said surface (11e) of said one member (11). An edge (e.g. 47a) of the first (lower) and second (upper) plate of each hinge acts as means aligned with respect to the member engaged thereby locating the pivotal interconnection means of the first and second hinges in coaxial relation. The said surface (e.g. 11e) of each member (e.g. 11) constitutes an end surface thereof, the two members being arranged for pivoting to an erected position wherein said members (e.g. 11 and 13) are generally aligned end-to-end as shown in FIG. 1 and a folded position as shown in FIG. 2 wherein said members are out of alignment. The fingers of each said first plate 37 of each hinge engage said end surface between the end surfaces of the two members. The elongate members (e.g. 11, 13) have parallel sides (e.g. 11c, 11d, 13c, 13d) in planes at right angles to their said faces wherein the plates have parallel side edges, one of said side edges of one of the plates being aligned with one of said side surfaces of the member to which it is nailed for locating the pivotal interconnection means of each of the first and second hinges a predetermined distance from said one side surface and thereby, in conjunction with the location of the plates by said fingers, locating the pivotal interconnection means of the first and second hinges in coaxial relation on an axis extending at right angles to the plane of the plates.

Half-truss structures 3 with paired hinges 35 at joints 17, 19 and 33 such as herein disclosed are especially suitable for use in roof structures for prefabricated modules for a house, each module comprising what amounts to half a house with a roof structure constituting half of the roof of the house as completed. In FIG. 2, such a module is indicated generally at 101, comprising an outside wall structure 103 and a support structure 105 opposite the outside wall structures extending up from a floor structure 107, and a series of half-trusses 3 on the wall structures, with roof covering 109, e.g. sheathing and shingles applied to the chord members 11, 13 and 15. For transport of the module 101 from the fabrication site to the building site, truss members 13, 15 and 31 of the half trusses in the series are folded as shown in FIG. 2, members 13 being folded down on members 5, members 15 being folded down from the members 13, and members 31 being folded up against members 13, the roof covering 109 on members 13 and 15 coming down along with these members, and the module is placed on a flat-bed trailer for being carried to the building site with the roof structure of the module (i.e. the half-roof complete with sheathing and shingles) in the collapsed condition illustrated in FIG. 2. This enables transport of the module on the flat-bed trailer with the height of the module reduced for clearance of overpasses. A typical height of the high point of the module with the half-trusses erected (as in FIG. 1) is about 21 feet, the height of the high point with the roof structure folded down (as in FIG. 2) being reduced to about 14 feet, for example, thus generally enabling clearance of underpasses as the module is hauled over the road.

At the building site, two of the half-house modules 101 are assembled with the support structures 105 adjacent one another at the building center line CL. The half-trusses 3 are erected, the roof covering 109 being raised with the raising of truss members 13 and 15. It will be understood that the roof covering on each series of half-trusses is applied in what amounts to three individual sections, one on truss members 11, one on truss members 13 and one on truss members 15, permitting the folding down and the raising of the three sections. Following the erection of the half-trusses with the roof sections thereon, additional truss members such as indicated at 111, 113 and 115 are applied and fastened in place by means of nailing plates at 117 and by nails driven through said additional members adjacent their outer ends into truss members 13 and 15. Members 15 of each half-truss are connected in suitable well-known manner at the peak 119 of complete truss, i.e. at the upper ends of members 15. Members 5 of each half-truss are connected in suitable well-known manner at the center of length 121 of the bottom chord 3 of the complete truss.

The pattern of slots and teeth illustrated in FIGS. 6 and 7 for the hinge plates 37 and 39 is of special significance in that it maximizes the holding power of the plates in the wooden members into which their teeth are driven. Referring to FIG. 12 which is a view of the inside face of the plate 37 on a larger scale than FIG. 7, it will be observed that the pattern of slots and teeth is such that there are first, second, third and fourth rows R1–R4 of slots in the plate extending longitudinally of the plate with the slots extending transversely of the plate, with teeth T extending perpendicularly to the plate at the ends of these slots. The first and second rows R1 and R2 extend longitudinally of the plate on opposite sides of the center line CL of the plate, with their inner ends adjacent the center line. As shown, each of rows R1 and R2 has five slots S1–S5 spaced at equal intervals longitudinally of the plate in the body 41 of the plate. The third and fourth rows R3 and R4 extend longitudinally of the plate, each having four slots S6–S9 spaced at equal intervals longitudinally of the plate in the body 41 of the plate. Slots S6–S9 of row R3 alternate with slots S1–S5 of row R1, being interdigitated with and offset outward from slots S1–S5 of row R1. Slots S6–S9 of row R4 alternate with slots S1–S5 of row R2, being interdigitated with and offset outward from slots 51–55 of row R2. The slots S1–S9 are all of the same length. As shown, the inner ends of slots S1–S5 of each row R1, R2 lie on lines L1 and L2 extending longitudinally of the plate on the respective side of the center line CL, spaced from the latter about one-fourth the slot length. The outer ends of the slots S1–S5 of each row R1, R2 are spaced inward from the respective side edge 47a, 47b of the plate a distance about two-thirds the slot length. The inner ends of slots S6–S9 of each row R3, R4 lie on lines extending longitudinally of the slots generally through the centers of length of slots S1–S5. The outer ends of slots S6–S9 lie on a line extending longitudinally of the plate spaced inward from the respective side edge of the plate a distance about one-fourth the slot length so that the plate has an uninterrupted margin M lying outward of the outer ends of slots S6–S9 having a width about one-fourth the slot length. Slots S1 of rows R1 and R2 are aligned transversely of the plate, slots S2 of rows R1 and R2 are aligned transversely of the plate, etc. Slots S6 of rows R3 and R4 are aligned transversely of the plate slots S7 of rows R3 and R4 are aligned transversely of the plate, etc. Slots S6 extend outward from between slots S1 and S2, slots S7 extend outward from between slots S2 and S3, etc.

Each plate further has two pairs of teeth T struck from the outer end region of the plate between the corner notches 53 forming a pair of slots each designated S10 extending transversely of the plate between said notches 53, and four pairs of teeth T struck from the region of the plate generally between the notches 57 forming two pairs of slots S11 and S12 extending transversely of the plate in said region. The two slots S10 of the pair in said outer end portions of the plate are aligned transversely of the plate. The two slots S11 of the pair in said region of the plate are aligned transversely of the plate, and the two slots S12 of the pair said region are aligned transversely of the plate. The teeth struck from each of the slots S10, S11 and S12 extend perpendicularly to the plate at the ends of the slots. The inner ends of slots S10, S11 and S12 lie closely adjacent the center line CL of the plate. The outer ends of slots S10 are spaced from the notches 53 and the outer ends of slots S11 and S12 are spaced from the notches 57 for continuity of the margin M. The teeth struck from the slots S11 and S12 further improve the performance of the hinge by increasing its resistance to buckling. The slots Sa lie between slots S12 and the line which extends transversely of the plates 37 through the fingers. The pattern of slots and teeth for the plate 39 is generally the same as the pattern of slots and teeth for the plate 37 as above described.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hinge for use in pairs for hingedly connecting two generally coplanar structural members for pivotal movement of one of said members relative to the other in the plane of said members about an axis transverse to the plane of said members, said hinge comprising first and second elongate sheet metal plates, each plate having one face constituting its outside face and the other face constituting its inside face, each said plate having a generally flat body portion and a generally flat extension from said body portion, the plates having their extensions overlapped with the outside face of the extension of the first plate in generally flatwise interengagement with the inside face of the extension of the second plate, and means pivotally interconnecting said overlapped extensions for pivotal movement of one of the plates relative to the other about an axis perpendicular to the plates, characterized in that one of the plates has plate locating means comprising fingers struck therefrom extending from the inside face thereof and having portions lying in a plane which is perpendicular to said one plate and which extends transversely with respect to said one plate, said portions being spaced apart in said plane and being adapted for engagement with a surface of one of said members transverse to the plane of said members for locating said one plate in a predetermined position relative to said one member, said body portion of each said plate being formed with nailing teeth extending from the inside face thereof constituting the plates as nailing plates for nailing of said first plate to one of said wooden members and the second plate to the other of said wooden members, said fingers being struck from said extension of said first plate and being longer than the teeth of said first plate with the tips of said fingers constituting said portions of the fingers located beyond the tips of the teeth of said first plate for sidewise engagement of said tips of the fingers with the surface of one of said members and with the tips of the teeth of said first plate adapted for engagement with a face of said one wooden member and with the tips of the teeth of the second plate adapted for engagement with a corresponding face of the other wooden member to locate the plates in said predetermined position relative to said wooden members whereby the nailing teeth of the plates may be driven into the wooden members.

2. A hinge as set forth in claim 1 wherein the plates have parallel side edges and the plane of said portions of the fingers is perpendicular to said side edges.

3. A hinge as set forth in claim 1 wherein the fingers are struck from said first plate leaving slots in said first plate and extend from said inside face of said first plate perpendicularly thereto.

4. A hinge as set forth in claim 3 having two and only two of said fingers struck from the extension of said first plate.

5. A hinge as set forth in claim 4 wherein the plates have parallel side edges and the plane of said portions of the two fingers is perpendicular to said side edges.

6. A hinge as set forth in claim 1 wherein the plane of the tips of the fingers is located between said pivotal interconnection means and the body portion of said first plate, the fingers extending perpendicularly to said first plate.

7. A hinge as set forth in claim 6 wherein the fingers are struck from the extension of said first plate leaving slots in the extension of said first plate with the longitudinal axes of the slots extending lengthwise thereof, the fingers extending perpendicularly to the extension of said first plate.

8. A hinge as set forth in claim 7 wherein the fingers are struck from the extension of said first plate adjacent opposite side edges of the extension of said first plate, each finger being rooted in the extension of said first plate at the end of the respective slot toward the body portion of said first plate, the slots extending on opposite sides of said pivotal interconnection means.

9. A hinge as set forth in claim 1 having teeth struck from the extension of said first plate adjacent the pivotal interconnection means.

10. A hinge as set forth in claim 1 wherein the teeth of each said plate are struck from the plate in such a pattern as to form first and second rows of slots in the plate on opposite sides of the longitudinal center line of the plate with the longitudinal axes of the slots in said first and second rows extending transversely of the plate, and third and fourth rows of slots with the slots in said third and fourth rows extending transversely of the plate and interdigitated with and offset outwardly of the slots of the first and second rows, the teeth extending perpendicularly to the plate at the ends of the slots.

11. A hinge as set forth in claim 10 wherein each said plate has a first pair of notches in its side edges defining a relatively narrow bridge portion of the plate, and a second pair of notches at the corners of the plate at its outer end defining an outer end portion of the body of the plate which is narrower than the portion of the body between the first and second pairs of notches, each said plate having two pairs of teeth struck from said outer end portion of the plate forming a pair of slots extending transversely of the plate in said outer end portion thereof between said second pair of notches, and four pairs of teeth struck from the region of the plate generally between said first pair of notches forming two pairs of slots extending transversely of the plate in said region, the slots of the pair in said outer end portion of the plate being aligned transversely of the plate, the slots of each of the two pairs of slots in said region being aligned transversely of the plate, the teeth struck from each of said slots in the outer end portion and said region of the plate extending perpendicularly to the plate at the ends of said slots.

12. A joint hingedly connecting two coplanar structural members for pivotal movement of one of said members relative to the other in the plane of said members, each member having first and second generally flat opposite faces and a surface in a plane perpendicular to said faces, said joint comprising a pair of hinges each as set forth in claim 1, a first hinge of said pair of hinges having the body portion of its first plate fastened to the first face of one of said members and the body portion of its second plate fastened to the first face of the other of said members with said locating means on said one plate engaging said surface of said one member locating the axis of the pivotal interconnection means of said first hinge of the pair at a predetermined distance from said surface of said one member, the second hinge of said pair of hinges having the body portion of its second plate fastened to the second face of one of said members and the body portion of its second plate fastened to the second face of the other of said members.

13. A joint hingedly connecting two generally coplanar wooden structural members for pivotal movement of one of said members relative to the other in the plane of said members, each member having first and second generally flat opposite faces and a surface in a plane perpendicular to said faces, said joint comprising a pair of hinges each as set forth in claim 1, a first hinge of said pair having the body portion of its first plate nailed by teeth thereof on the first face of one of said members and the body portion of its second plate nailed by the teeth thereof on the first face of the other of said members with the tips of the fingers on said first plate engaging said surface of said one member locating the axis of the pivotal interconnection means of said first hinge of the pair at a predetermined distance from said surface of said one member, the second hinge of said pair of hinges having the body portion of its first plate nailed by the teeth thereof to the second face of other of said members and the body portion of its second plate nailed by the teeth thereof to the second face of the other of said members with the tips of the fingers on the first plate of the second hinge engaging said surface of said one member locating the axis of the pivotal interconnection means of the second hinge of the pair at said predetermined distance from said surface of said one member.

14. A joint as set forth in claim 13 wherein the wooden members are elongate members, said surface of each said member constituting an end surface thereof, the members being arranged for pivoting thereof to an erected position wherein said members are generally aligned end-to-end and a folded position wherein said members are out of alignment, and wherein said fingers of each said first plate engage the end surface of one of said elongate members between the end surfaces of the two elongate surfaces.

15. A joint as set forth in claim 14 wherein the elongate wooden members have parallel sides in planes at right angles to said faces and wherein the plates have parallel side edges, one of said side edges of each of said first plates being aligned with one of said side surfaces of the member to which it is nailed for locating the pivotal interconnection means of each of the first and second hinges a predetermined distance from said one side surface and thereby, in conjunction with the location of the plates by said fingers, locating the pivotal interconnection means of the first and second hinges in coaxial relation on an axis extending at right angles to the plane of the plates.

16. A hinge for use in pairs for hingedly connecting two generally coplanar wooden structural members for pivotal movement of one of said members relative to the other in the plane of said members about an axis transverse to the plane of said members, said hinge comprising first and second elongate sheet metal plates, each plate having one face constituting its outside face and the other face constituting its inside face, each of said plates having a generally flat body portion and a generally flat extension from said body portion, the plates having their extensions overlapped with the outside face of the extension of the first plate in generally flatwise interengagement with the inside face of the extension of the second plate, and means pivotally interconnecting said overlapped extensions for pivotal movement of one of the plates relative to the other about an axis perpendicular to the plates, characterized in that the body portion of each of said plates is formed with nailing teeth extending from the inside face thereof constituting the plates as nailing plates for nailing of the first plate to the one of said wooden members and the second plate to the other of said wooden members, the teeth of each said plate being struck from the plate in such a pattern as to form first and second rows of slots in the plate on opposite sides of the longitudinal center line of the plate with the longitudinal axes of the slots in said first and second rows extending transversely of the plate, and third and fourth rows of slots with the longitudinal axes of the slots in said third and fourth rows extending transversely of the plate and interdigitated with and offset outwardly of the slots of the first and second rows, the teeth extending perpendicularly to the plate at the ends of the slots.

17. A hinge as set forth in claim 16 wherein each said plate has a first pair of notches in its side edges defining a relatively narrow bridge portion of the plate, and a second pair of notches at the corners of the plate at its outer end defining an outer end portion of the body of the plate which is narrower than the portion of the body between the first and second pairs of notches, each said plate having two pairs of teeth struck from said outer end portion of the plate forming a pair of slots with their longitudinal axes extending transversely of the plate in said outer end portion thereof between said second pair of notches, and four pairs of teeth struck from a region of the plate generally between said first pair of notches forming two pairs of slots with their longitudinal axes extending transversely of the plate in said region, the longitudinal axes of the slots of the pair in said outer end portion of the plate being aligned transversely of the plate, the longitudinal axes of the slots of each of the two pairs of slots in said region being aligned transversely of the plate, the teeth struck from each of said slots in the outer end portion and said region of the plate extending perpendicularly to the plate at the ends of said slots.

* * * * *